United States Patent
Lafleur et al.

(10) Patent No.: US 9,197,516 B2
(45) Date of Patent: Nov. 24, 2015

(54) IN-SERVICE THROUGHPUT TESTING IN DISTRIBUTED ROUTER/SWITCH ARCHITECTURES

(71) Applicant: ALCATEL-LUCENT, Paris (FR)

(72) Inventors: Daniel Lafleur, Kanata (CA); Alp Dibirdi, Andover, MA (US)

(73) Assignee: Alcatel Lucent, Boulogne-Billancourt (FR)

(*) Notice: Subject to any disclaimer, the term of this patent is extended or adjusted under 35 U.S.C. 154(b) by 218 days.

(21) Appl. No.: 13/924,778

(22) Filed: Jun. 24, 2013

(65) Prior Publication Data

US 2013/0286874 A1    Oct. 31, 2013

Related U.S. Application Data

(63) Continuation of application No. 13/039,738, filed on Mar. 3, 2011, now Pat. No. 8,520,534.

(51) Int. Cl.
*H04L 12/24* (2006.01)
*H04L 12/26* (2006.01)

(52) U.S. Cl.
CPC ........ *H04L 41/5038* (2013.01); *H04L 12/2697* (2013.01); *H04L 43/10* (2013.01); *H04L 43/50* (2013.01); *H04L 43/0829* (2013.01); *H04L 43/0852* (2013.01)

(58) Field of Classification Search
None
See application file for complete search history.

(56) References Cited

U.S. PATENT DOCUMENTS

| | | | |
|---|---|---|---|
| 7,768,928 B2 | 8/2010 | Harel et al. | |
| 2002/0083233 A1* | 6/2002 | Owen et al. | 710/60 |
| 2005/0216822 A1* | 9/2005 | Kyusojin et al. | 715/501.1 |
| 2006/0140128 A1* | 6/2006 | Chi et al. | 370/241 |
| 2007/0189184 A1* | 8/2007 | Ryu et al. | 370/252 |
| 2007/0223456 A1* | 9/2007 | Maruyama et al. | 370/352 |

(Continued)

FOREIGN PATENT DOCUMENTS

| | | |
|---|---|---|
| CN | 10184930 A | 9/2010 |
| JP | 2007259069 A | 10/2007 |

(Continued)

OTHER PUBLICATIONS

Korean Office Action dated Jul. 29, 2014 for Korean Patent Application No. 2013-7023230.

(Continued)

*Primary Examiner* — Benjamin H Elliott, IV
(74) *Attorney, Agent, or Firm* — Kramer & Amado, P.C.

(57) ABSTRACT

Various embodiments relate to a system and related method of measuring at least one transport link's performance in a communications network. An originating device controlled by a customer may generate testing frames that are transported to a receiving device also controlled by the customer through the at least one transport link that connects the two devices. In some embodiments, the transport links may transfer the testing frames while the transport links are transporting other data traffic. The receiving device may parse incoming frames and, upon identifying the testing frames, may generate echoing response frames. In some embodiments, the echoing response frames may be placed in one of a series of priority-based service queues. The originating device may then receive the response frames through the transport links and may measure the stream of incoming frames to measure and analyze the transport links' performance.

20 Claims, 3 Drawing Sheets

(56) References Cited

U.S. PATENT DOCUMENTS

| | | |
|---|---|---|
| 2008/0219268 A1 | 9/2008 | Dennison |
| 2009/0059799 A1 | 3/2009 | Friskney et al. |
| 2009/0073988 A1 | 3/2009 | Ghodrat et al. |
| 2009/0138570 A1* | 5/2009 | Miura et al. ............. 709/217 |
| 2010/0195489 A1 | 8/2010 | Zhou et al. |
| 2010/0278048 A1* | 11/2010 | Sawaguchi ............. 370/241.1 |

FOREIGN PATENT DOCUMENTS

| | | |
|---|---|---|
| JP | 2009135821 A | 6/2009 |
| WO | 2008007353 A2 | 1/2008 |

OTHER PUBLICATIONS

IEEE Computer Society; IEEE P802.1ag/D8.1 Virtual Bridged Local Area Networks—Amendment 5: Connectivity Fault Management(part) Jun. 18, 2007, pp. 122-182.

International Search Report for PCT/US2012/028740) dated Feb. 27, 2012.

Office Action for Japanese Application No. 2013-556764 dated Oct. 28, 2014.

* cited by examiner

IN-SERVICE THROUGHPUT TESTING IN DISTRIBUTED ROUTER/SWITCH ARCHITECTURES

RELATED APPLICATIONS

This application is a continuation of application Ser. No. 13/039,738, filed on Mar. 3, 2011, the entire disclosure of which is hereby incorporated herein by reference for all purposes.

TECHNICAL FIELD

Various exemplary embodiments disclosed herein relate generally to diagnostics and maintenance of communications networks.

BACKGROUND

Providers of various communications services use various types of links to transfer traffic between various devices they control. These transfers enable the service provider (SP) to distribute data to a large number of clients efficiently. These backbone transport links use a large bandwidth to transfer large quantities data between devices, such as high-priority data like video and voice messaging that may require constant transfers when in use. In certain circumstances, the SPs may lease backbone transport links to efficiently transport such traffic between their devices, such as switches, routers, or aggregation sites over a geographic area.

When setting up a leased transport link for a customer such as an SP, a transport provider (TP) may be required to adhere to a Service Level Agreement (SLA) that outlines one or more performance metrics required of the transport link being leased by the customer (e.g., service provider). For example, when leasing an Ethernet Private Line (EPL) or Ethernet Virtual Private Line (EVPL), the customer may require the transport link or links to minimize loss, delay, and/or jitter. The customer may also require a minimum level of bandwidth availability in order to transport data. While the customer may test the leased link during the initial provisioning of the link for transport between the customer's devices, the conditions for the TP and/or leased transport link may change after the initial provisioning.

SUMMARY

A brief summary of various exemplary embodiments is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in the later sections.

Various embodiments may relate to a method of testing at least one transport link in a communications system, the method including one or more of the following: generating, by a first communications device including a first aggregation circuit, a testing frame including a destination address for a second communications device including a second aggregation circuit; sending, by the first communications device, the testing frame to the destination address; receiving, by a port in the second communications device, an incoming frame originating from the first communications device; determining, by the second communications device, that the incoming frame includes the testing frame; producing, by the second communications device, a response frame based on the testing frame; and sending, by the second communications device, the response frame to the first communications device.

Various embodiments may also relate to a method of testing a transport link in a communications system, the method including one or more of the following: receiving, by a first node of the transport link, a testing frame including a testing destination address and a testing source address; forwarding, by the transport link through a second node opposite the first node, the testing frame towards the testing destination address; receiving, by the second node of the transport link, a response frame based on the testing frame, wherein the response destination address is equivalent to the testing source address and the response source address is equivalent to the testing destination address; and forwarding, by the transport link through the first node, the response frame.

Various embodiments may relate to a communications system that tests at least one transport link, the system including one or more of the following: a first communications device including a first aggregation circuit; and a second communications device including a second aggregation circuit and a port, wherein the second communication device; wherein the first communications device: generates a testing frame including a destination address for the second communications device, and sends the testing frame to the second device; and further wherein the second communications device: receives, through the port, an incoming frame originating from the first communications device, determines that the incoming frame includes a testing frame, produces a response frame based on the testing frame, and sends the response frame to the first communications device.

Various embodiments may relate to a transport link in a communications system including one or more of the following: a first node that receives a testing frame including a testing destination address and a testing source address; a second node in the transport link opposite the first node that forwards the testing frame towards the testing destination address and receives a response frame based on the testing frame, wherein the response destination address is equivalent to the testing source address and the response source address is equivalent to the testing destination address, and further wherein by the transport link forwards the response frame through the first node.

Various embodiments are described wherein the testing and response frames are sent through the at least one transport link that connects the first communications device with the second communications device without suspending transport of other frames through the at least one transport link.

Various embodiments additionally or alternatively include measuring, by the first communications device, performance of the at least one transport link based on traffic received from the at least one transport link, including the response frame received from the second communications device.

Various embodiments additionally or alternatively include placing the response in one of a plurality of priority-based service queues in the second communications device, wherein the testing and response frames have a priority level that is configurable by a user.

Various embodiments are described wherein the first communications device measures performance of the at least one transport link allocated to the priority levels at or below the priority level associated with the testing frame or response frame.

Various embodiments are described wherein the determining step further includes: determining, at the port in second communications device, that a destination address included the incoming frame is that of the second communications device; and determining that a sub-type including in the incoming frame is a sub-type associated with a testing frame.

Various embodiments are described wherein the producing step further includes: determining the destination address and a source address included the incoming frame; and adding to the response frame: a response source address equivalent to the destination address included in the incoming frame, a response destination address equivalent to the source address included in the incoming frame, and a sub-type associated with a response frame.

Various embodiments are described wherein the at least one transport link includes an Ethernet link and further wherein the first and second aggregation circuits receive traffic originating from more than one source.

Various embodiments additionally or alternatively include setting a target bandwidth capacity (TBC) for the at least one transport link, wherein the first communications device repeats the sending of the testing frame step at a rate less than the TBC.

It should be apparent that, in this manner, various exemplary embodiments enable measurement and testing of transport links between communications devices. Particularly, by measuring the transport of customer-generated testing frames, a customer may effectively measure the performance of transport links without significant effects on other data traffic.

BRIEF DESCRIPTION OF THE DRAWINGS

In order to better understand various exemplary embodiments, reference is made to the accompanying drawings wherein.

DETAILED DESCRIPTION

Figure 1:
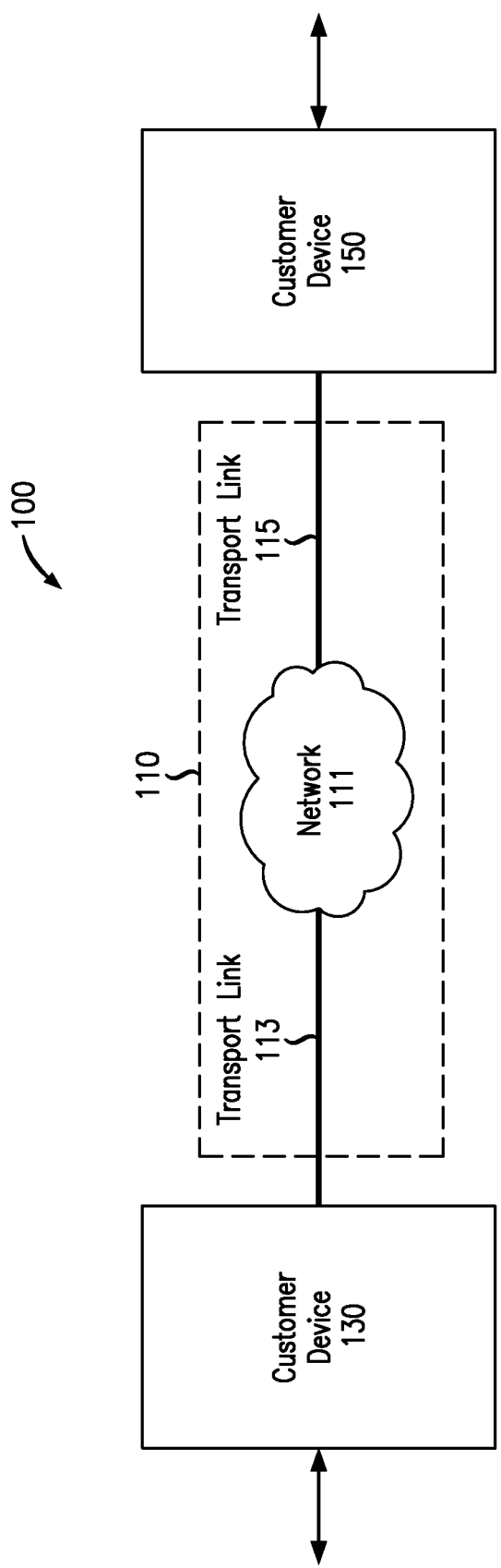
FIG. 1 illustrates an exemplary communications system including a transport link provider.

Referring now to the drawings, in which like numerals refer to like components or steps, there are disclosed broad aspects of various exemplary embodiments.

FIG. 1 illustrates an exemplary communications system including a transport link provider. Communications system 100 may include a transport network 110 and customer devices 130, 150. Transport network 110 may include a network 111 and transport links 113, 115. Communications system 100 may enable the customer devices 130, 150 to send traffic to each other in the form of packets, such as Ethernet frames, through the use of the transport network 110 that connects the devices to each other. In some embodiments, the components of the communications system may be controlled by different entities. For example, in an exemplary embodiment, the customer devices 130, 150 may be controlled by a customer such as a service provider (SP) that may in turn transport various forms of data to its clients. The SP-as-customer may connect devices through the transport network 110 that is controlled by a transport provider (TP). The SP may lease one or more links to handle transfer of data between its devices, such as the transport network 110 handling communications between the customer devices 130, 150 through its transport links 113, 115 and the network 111. In such instances, the SP may use the transport network 110 without exerting significant control over the network itself.

Transport network 110 may include the network 111 and one or more transport links 113. Transport network 110 may include various other connections to other devices as well. Network 111 may be, for example, a packet-switching network that is able to forward packets to other devices based on information included in the packet. Similarly, the transport links 113, 115 may be physical or virtual links, such as Ethernet Private Lines (EPL) or Ethernet Virtual Private Lines (EVPL) that may transport packets based on information included in the packet. For example, when the transport link 113 is an EPL, it may receive one or more Ethernet frames at one of its end nodes. Transport link 113 may then move the frame within the link and may, upon reaching an opposite end node, forward the frame based on information included in the overhead of the frame (i.e., the destination address). In some embodiments, the transport network 110 may also control the customer devices 130, 150. This may occur when a service provider is also a transport provider. This may also occur when the transport provider uses endpoint devices to test the performance of its own transport links 113, 115.

Customer devices 130, 150 may be devices that may receive data in the form of packets from one or more sources and may direct such traffic based on its included information. For example, the customer devices may be aggregation devices, such as switches, routers, bridges, or similar equipment that may receive packets (e.g., Ethernet frames) from a variety of sources and may forward them based on information included in the overhead of the packet. In some embodiments, one or more of the customer devices 130, 150 may include larger aggregation devices, including first-level aggregation devices such as hubs, switching offices, central offices, or similar devices and/or sites.

Customer devices 130, 150 may be controlled by a customer such as a service provider that may provide mobile, DSL/PON, fiber-optic, or similar services to its clients. In some embodiments, the SP may provide a specific type of service to its clients while leasing backbone support from the traffic provider. For example, an SP may provide mobile connectivity to its clients while leasing EPLs from a TP. The leased transport links 113, 115 may enable the customer devices 130, 150 to transfer large amounts of data between devices. This may enable the SP to more effectively provide data and services, such as video conferencing, to its clients.

When using the transport links 113, 115 to connect the customer devices 130, 150, the SP may use a Service License Agreement (SLA) to specify a set of requirements for the leased links. For example, an SP may use the SLA to specify certain performance requirements, such as minimum bandwidth availability, minimum speed of transfer, and maximum amounts of delay, loss, and jitter within the links it leases. In some embodiments, the SP may use one or more diagnostic tests, such as looping tests, to determine whether the leased links satisfy the SLA requirements. In such instances, the SP may run such diagnostic tests upon the initial provisioning of the link. When the provisioned link does not meet the SLA requirements, the SP may take a number of actions, such as leasing links from another TP, or alerting the TP of the problem (e.g., an alarm to the TP), after which the TP may take corrective actions.

However, in some instances, the leased transport links 113, 115 may have their performance altered over time. This may be due to, for example, a loss of one or more transport links 113, 115 within the transport network, or an unplanned oversubscription of the network 111. Such a loss in available bandwidth capacity on the leased link may in turn degrade performance for the clients of the SP. In order to avoid such losses in performance, the SP may periodically run diagnostic tests similar to the tests run during the initial provisioning. However, some of the diagnostic tests used to determine the performance of a transport link 113, 115 may significantly slow or stop all other traffic. For example, a looping test of the transport links 113, 115 initiated by the customer device 150 may stop the SP's service, as the testing frames used in the looping tests may stop the transfer of high-priority data like the synchronization frames used for voice and/or video conferencing and streaming. As a result the SP at the customer device 150 may limit the times that such tests are run, such as running diagnostic looping tests that alter data traffic during very-low-congestion periods.

Figure 2:
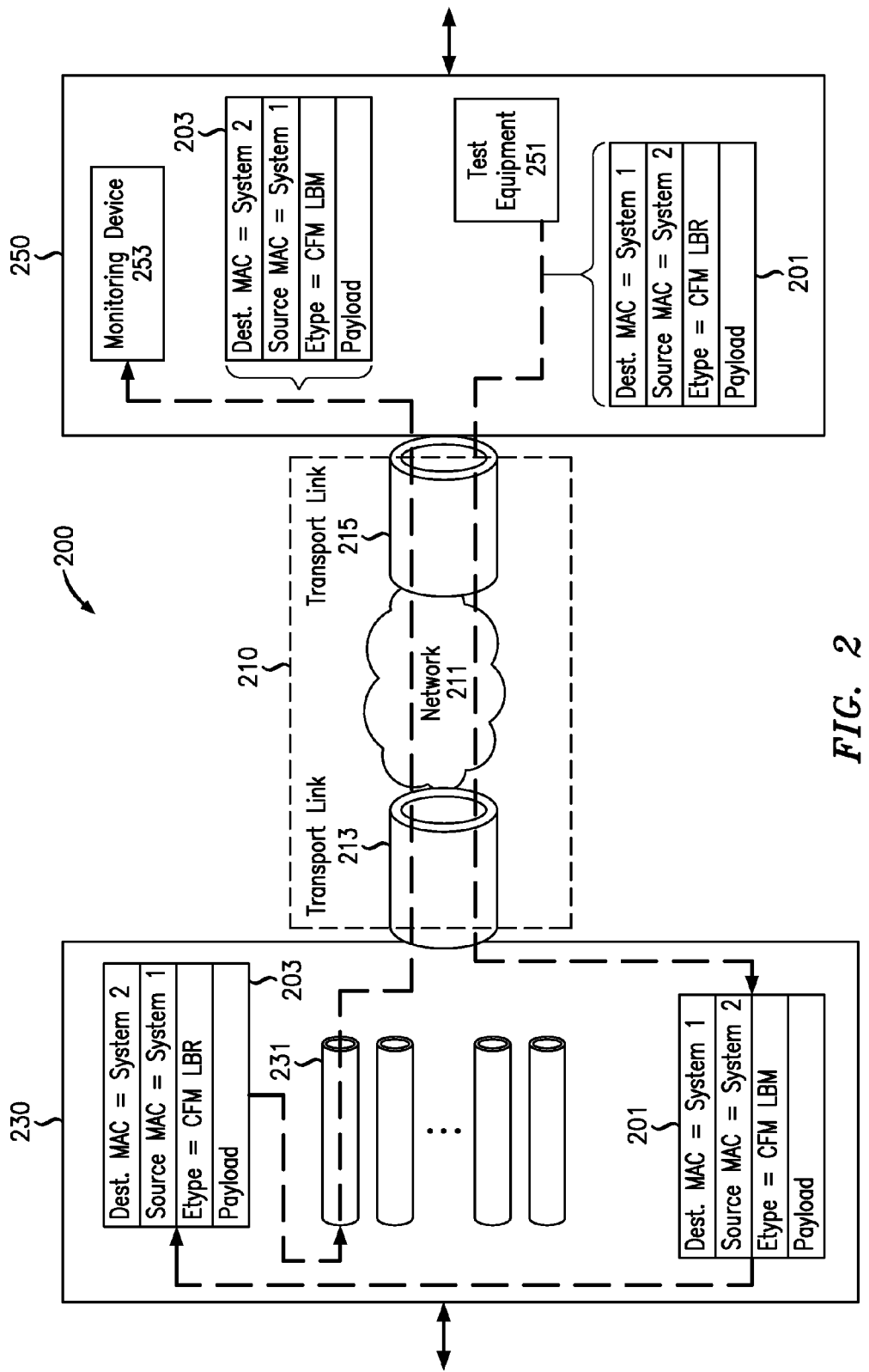
FIG. 2 illustrates an exemplary communications system for testing a transport link.

FIG. 2 illustrates an exemplary communications system for testing a transport link. Communications system 200 is similar to communications system 100 in FIG. 1, with transport network 210 and its elements 211-215 and consumer devices 230, 250 being similar to elements 110-150 in FIG. 1. Consumer element 230 may include a series of service queues 231. Consumer element 250 may include testing equipment 251 and a monitoring device 253. In some embodiments, the SP may use a testing frame 201 and a response frame 203 that may be passed between the consumer devices 230, 250 through the transport network 210. The transport of the frames 201, 203 may be measured to, for example, determine the performance (e.g., available bandwidth) of the series of leased transport links 213, 215 used to transport the Ethernet frames 201, 203 between the consumer devices 230, 250.

Customer devices 230, 250 may be similar to customer devices 130, 150 and may be aggregation devices that receive data packets from a plurality of sources and may transfer the packets to other devices based on information included in the packets. In addition, the customer devices 230, 250 may also include service queues 231, testing equipment 251, and/or a monitoring device 253. While the illustrated embodiment shows these components in only one of the customer devices 230, 250, various embodiments of the customer devices 230, 250 may include all of the components 231, 251, 253. In some embodiments, the originating customer device 250 may be a larger aggregating device than the receiving customer device 230. For example, the originating customer 250 may comprise a central switching office, while the receiving customer device 230 may comprise a switch.

A service provider may use the customer devices 230, 250 to run a diagnostic test after the provisioning of the transport links 213, 215 without affecting the services related to other data traffic. For example, the transport link 215 may receive the testing frame 201 from the testing equipment 251 in the originating customer device 250 and may transport the testing frame 201 along with other data traffic to the receiving device. In other embodiments, the diagnostic test run by the testing equipment may prevent the transport of other traffic. For example, the testing equipment may produce k testing frames 201 per second. If rate k is larger than the available bandwidth on at least one of the transport links 213, 215, the one or more transport links 213, 215 may not be able to transfer any other data. Similarly, a very high rate k may slow the delivery of other data traffic.

Testing equipment 251 may comprise internal or external components that may initiate testing of the transport links 213, 215. In some embodiments, the testing equipment 251 may comprise an internal circuit or software module within the originating customer device 250 that produces one or more testing frames 201. Testing equipment 251 may be connected to a port in the originating customer device 250 and may send the testing frames 201 to the transport link 215 through the port. Testing equipment 251 may produce the testing frames 201 based on the bandwidth availability of the leased transport links 213, 215.

In some embodiments, the testing equipment 251 may initially use the required bandwidth specified in the SLA and may adjust the available bandwidth based on information compiled by the monitoring device 253. For example, the SLA may require a channel capacity (i.e., bandwidth) of 1 Mb/s. Testing equipment 251 may produce a series of 32-bit Ethernet testing frames 201 for the leased transport links 213, 215 to carry to the receiving customer device 230. In some embodiments, the testing equipment 251 may produce the testing frames 201 at a rate proportional to the target channel capacity set by the SLA (e.g., 50% of the target channel capacity) and may increase the production rate until it is substantially equal to the target available channel capacity.

Testing frame 201 may comprise a packet produced by the testing equipment 251 that may be used by the originating and receiving customer devices 250, 230 to determine the performance of the transport links 213, 215. Testing frame 201 may comprise a 32-bit Ethernet frame that includes an overhead and a payload. In some embodiments, the payload of the testing frame 201 may not be read by equipment in the customer devices 230, 250 or within the network 211. The overhead of the testing frame 201 may include destination and source addresses used by devices in the communications network 200 to transport the testing frame 201. The destination and source addresses may comprise, for example, media access code (MAC) addresses used by the network 211 to locate the customer devices 230, 250 and direct traffic within the network to the destination address. In some embodiments, the device at the destination address may check portions of the overhead, such as the source address, to ensure that the packet originated from an applicable location.

The overhead of the testing frame 201 may also include an Ethernet type (e.g., EtherType) that may be used by the customer devices 230, 250 to indicate that the frame is a testing frame and does not include any specific data encapsulated in the payload. For example, regular data traffic may be transported in an Ethernet frame that includes a two-octet EtherType designation in its overhead to indicate that the payload is Internet Protocol, Version 4 (IPv4). Testing equipment 251 may insert an EtherType that indicates that the frame is a testing frame. For example, the testing equipment may include an EtherType of "0x8902" to indicate that the protocol used is for IEEE 802.1ag Connectivity Fault Management Protocol/ITU-T Recommendation Y.1731 (CFM/OAM) or "0x9000" to indicate that the protocol is a configuration test protocol loopback message (LBM). In some embodiments, the testing equipment 251 may use an undefined set to define a new protocol, such as CFM/LBM.

Receiving customer device 230 may include a port that receives the at least one testing frame 201 sent from the originating customer device 250 through the transport links 213, 215. A component in the receiving customer device 230 may examine the overhead of incoming frames to determine how to handle the incoming frames. For example, the component may examine the destination MAC address of an incoming Ethernet frame and determine that its destination is not the receiving customer device 230. In such instances, the receiving customer device 230 may forward the incoming frame to another device in the communications network 200. Alternatively, the receiving customer device 230 may determine that the destination MAC address of the incoming frame matches that of the receiving customer device 230. When this occurs, the receiving customer device 230 may further process the incoming packet.

When processing an incoming packet, the receiving customer device 230 may examine the EtherType to determine how to handle the payload. For example, the receiving customer device 230 may use the EtherType to identify the contents of the payload of the incoming frame for further processing. For example, when the incoming packet includes an EtherType identifying the incoming packet as containing IPv6 protocol, the receiving customer device 230 may extract the IPv6 address from the payload. In a similar manner, the receiving customer device 230 may respond to the incoming testing packet 201 when it determines that the EtherType of the packet is associated with the testing protocol in use (e.g., Etype=CFM LBM).

When the receiving customer device 230 determines that it has received a testing frame 201, it may produce a response frame 203. Response frame 203 may be similar to the testing frame 201 and may include similar data in its overhead and within its payload. However, the response frame 203 may have its address information switched so that it echoes the overhead information included in the testing frame 201. For example, when the testing frame 201 includes a destination address of x and a source address of y, the response frame 203 may include a destination address of y and a source address of x. In such instances, the response frame 203 may be sent back to the originating customer device 250, with the originating customer device 250 able to identify an incoming frame as a response frame 203 due to the contents of the overhead.

Receiving customer device 230 may also include one or more service queues 231 used to schedule the transmission of outgoing packets from the receiving customer device 230. Receiving customer device 230 may use the service queues to schedule the transmission of outgoing data packets based on specified criteria. For example, the service queues 231 may be priority-based service queues, including high-priority and low-priority service queues 231. In such an embodiment, the packets scheduled in the high-priority service queue 231 may be scheduled to be transferred from the receiving customer device 230 at a higher rate or within a designated portion of the allocated channel capacity. One of skill in the art would be aware of priority-based queuing techniques used in the art. In some embodiments, the SP may set priority levels for different types of data. For example, voice, video, and synchronization packets or frames may be classified as high priority and be scheduled in the high-priority service queue 231, while text and similar data traffic may be classified as low priority and scheduled within the low-priority service queue 231. SP may designate the testing frames 201 a priority level in order to place the corresponding response frames 203 in one of the service queues 231.

For example, when the testing frames are designated a low priority level, the corresponding response frames 203 will be placed in the low priority level and may be scheduled to be transmitted to the originating customer device 250 after all scheduled traffic in the higher-priority queues are clear. In some embodiments, the response frames 203 may be scheduled to be transferred to the originating customer device 250 using portions of the bandwidth that were not allocated to higher priority levels. When assigned a low priority, the testing frames 201 and/or response frames 203 may minimally affect the transfer of higher-priority frames. In contrast, when the testing frames 201 and/or response frames 203 are assigned higher priority levels, the transmission of such frames may affect the transmission of other frames at or below that of the testing and/or response frames' 201, 203 priority level.

Once sent through the port of the receiving customer device 230, the response frame 203 may use the same transport links 213, 215 used to transmit the testing frame 201. In some embodiments, different transport links may be used to complete the transport loop between the customer devices 230, 250. In such instances, the diagnostic test measures the performance of all the transport links 213, 215 used to complete the transport loop.

Originating customer device 250 may also include a monitoring device 253 that monitors incoming frames received at the port of the originating customer device. Monitoring device 253 may comprise a hardware component and/or a software module that may examine incoming frames received at the port of the originating customer device 250 and may cause the originating customer device 250 to respond to the monitored activity. For example, in some embodiments, the monitoring device 253 may monitor all data traffic received at the port and may detect performance metrics such as delay, jitter, and packet loss. In other embodiments, the monitoring device may examine the overhead of the incoming frames and may make specific measurements regarding the response frames 203. For example, the monitoring device may measure the rate of response frames 203 received at the port of the originating customer device 250. This incoming rate of response frames 203 may be compared to the generation rate of the testing frames 201 made by the testing equipment 251 to determine performance metrics associated with the transport links 213, 215. When the performance metrics measured by the monitoring device 253 do not meet the requirements set by the SLA, the originating customer device 253 may take a response, such as triggering the SP to lease more transport links, or to alert the TP of the under-performing leased transport link or links 213, 215.

Figure 3:
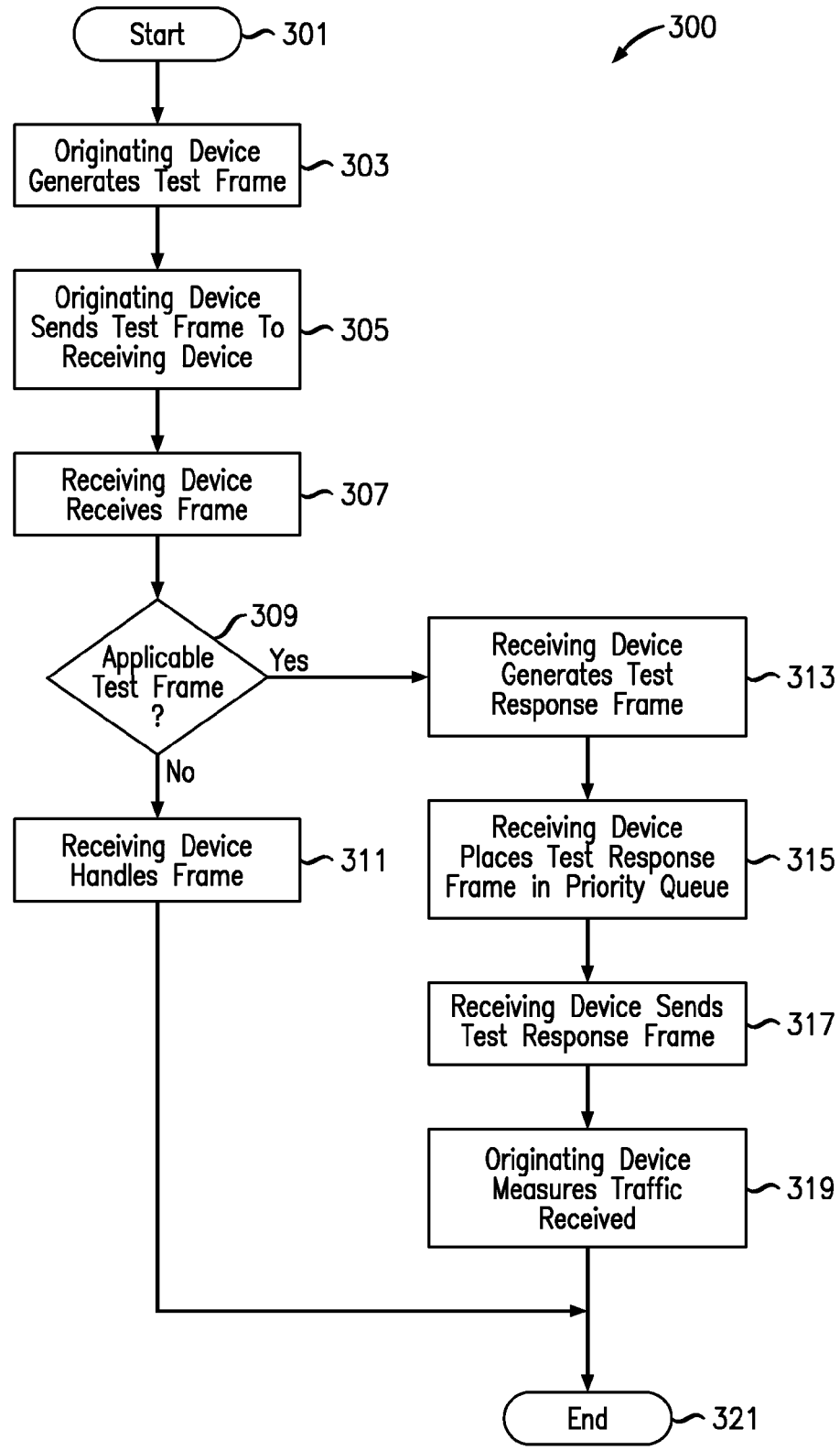
FIG. 3 illustrates a flowchart for testing a transport link.

FIG. 3 illustrates a flowchart for testing a transport link. Communications system 200 may use method 300 to test or measure the performance of the one or more transport links 213, 215 that connect the consumer devices 230, 250.

Method 300 may begin at step 301 and may proceed to step 303, where the originating customer device 250 may generate a testing frame 201. Testing equipment 251 included with the customer device 250 may produce testing frames 201 at a rate of k Ethernet testing frames 201 per second, the testing frames 201 including overhead with a destination address of the receiving device 230. At step 305, the originating customer device 250 may forward the Ethernet testing frames to the receiving (target) device.

Receiving customer device 230 may in step 307 an incoming frame through the transport links 213, 215 from, for example, the originating customer device 250. In step 309, the receiving customer device 230 may examine the overhead of the incoming frame to determine whether the incoming frame is an applicable testing frame 201. When the incoming frame is not an applicable testing frame (e.g., different destination address or different EtherType), the receiving customer device may proceed to step 311, where it may handle the frame based on the information in the overhead. This may include forwarding the packet towards the destination address, or handling the frame based on the information provided by the EtherType. In contrast, when the receiving customer device 230 determines in step 309 that the incoming frame is an applicable testing frame, it may proceed to step 313, where the receiving customer device 230 generates a response frame 203.

In step 313, the response frame 203 generated by the receiving customer device 230 may correspond to the received testing frame 201 and may include similar information in its overhead. Response frame 203 may also have the relevant address information echoed so that the destination address included in the response frame 203 corresponds to the source address included in the testing frame 201.

In step 315, the receiving customer device 250 may schedule transmission of the response frame 203 by placing the response frame 203 in a service queue 231. In some embodiments, the receiving customer device 250 may include a plurality of service queues 231 and may place the response frame 203 in one of the service queues based on defined criteria. For example, when the receiving customer device 230 includes a plurality of priority-based queues, the response frame 203 may be placed in one of the queues 231 based on the priority level associated with the testing. For example, when the testing frames 201 and/or response frames 203 are designated as low priority, the receiving customer device 230 may place the response frame 203 in the low-priority queue. In step 317, the receiving device 230 may send the response frame 203 based on the schedule of the service queue 231.

In step 319, the monitoring device 253 included in the originating customer device 250 may monitor traffic received over the transport links 213, 215. In some embodiments, the monitoring device 253 may examine incoming packets to the originating customer device 250 to specifically monitor incoming response packets 203. Based on measurements of the incoming packets, the monitoring device 253 and/or the originating customer device 250 may measure the performance of the transport links 213, 215 used to transmit the testing frames 201 and the response frames 203. Method 300 may end at step 321, where the measured performance of the transport links 213, 215 may trigger the originating customer device 250 to take a responsive action.

It should be apparent from the foregoing description that various exemplary embodiments of the invention may be implemented in hardware and/or firmware. Furthermore, various exemplary embodiments may be implemented as instructions stored on a tangible non-transitory machine-readable storage medium, which may be read and executed by at least one processor to perform the operations described in detail herein. A tangible machine-readable storage medium may include any mechanism for storing information in a tangible form readable by a machine, such as a personal or laptop computer, a server, or other computing device. Thus, a tangible machine-readable storage medium may include read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo-code, and the like represent various processes that may be substantially represented in tangible machine readable media and so executed by a computer or processor, whether or not such computer or processor is explicitly shown.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be effected while remaining within the spirit and scope of the invention. Accordingly, the foregoing disclosure, description, and figures are for illustrative purposes only and do not in any way limit the invention, which is defined only by the claims.

We claim:

1. A method performed by a network device for handling testing frames, the method comprising:
   receiving, by the network device, a received frame sent by a sending device;
   identifying, by a layer 2 protocol implementation of the network device, the received frame as a testing frame;
   generating, by the layer 2 protocol implementation, a response frame based on the testing frame;
   identifying, by the layer 2 protocol implementation, a configurable priority level associated with the response frame;
   placing the response frame in a priority queue of a plurality of layer 2 priority queues, wherein the priority queue is associated with the configurable priority level; and
   transmitting, from the priority queue, the response frame toward the sending device.

2. The method of claim 1, wherein identifying the configurable priority level comprises identifying a designation of the priority level included in the testing frame.

3. The method of claim 1, wherein the response frame is transmitted without suspending transport of other frames corresponding to non-diagnostic traffic.

4. The method of claim 1, wherein identifying the received frame as a testing frame comprises:
   determining, by an Ethernet port of the network device, that a destination address included in the received frame is an address of the network device.

5. The method of claim 1, wherein identifying the received frame as a testing frame comprises:
   determining, by an Ethernet port of the network device, that an Ethernet sub-type carried by the received frame indicates that the received frame is a testing frame.

6. The method of claim 1, wherein generating the response frame comprises:
   setting, by an Ethernet port of the network device, a destination address of the response frame equal to a source address of the received frame; and
   setting, by the Ethernet port of the network device, an Ethernet sub-type of the response frame equal to a value that identifies the response frame as a responding to a test frame.

7. The method of claim 1, wherein the steps of identifying the received frame and generating the response frame are performed by an Ethernet port of the network device.

8. A communications device for enabling testing of a transport link, the device comprising:
   an Ethernet port configured to:
      receive a received frame sent by a sending device;
      identify the received frame as a testing frame;
      generate a response frame based on the testing frame;
      identify a configurable priority level associated with the response frame;
      place the response frame in a priority queue of a plurality of priority queues, wherein the priority queue is associated with the configurable priority level; and
      transmit, from the priority queue, the response frame toward the sending device.

9. The communications device of claim 8, wherein, in identifying the configurable priority level, the Ethernet port is configured to identify a designation of the priority level included in the testing frame.

10. The communications device of claim 8, wherein the Ethernet port transmits the response frame without suspending transport of other frames corresponding to non-diagnostic traffic.

11. The communications device of claim 8, wherein, in identifying the received frame as a testing frame, the Ethernet port is configured to:
   determine that a destination address included in the received frame is an address of the network device.

12. The communications device of claim 8, wherein, in identifying the received frame as a testing frame, the Ethernet port is configured to:
- determine, by an Ethernet port of the network device, that an Ethernet sub-type carried by the received frame indicates that the received frame is a testing frame.

13. The communications device of claim 8, wherein, in generating the response frame, the Ethernet port is configured to:
- set a destination address of the response frame equal to a source address of the received frame; and
- set an Ethernet sub-type of the response frame equal to a value that identifies the response frame as a responding to a test frame.

14. A non-transitory machine-readable storage medium encoded with instructions for execution by a network device for handling testing frames, the medium comprising:
- instructions for receiving, by the network device, a received frame sent by a sending device;
- instructions for identifying, by a layer 2 protocol implementation of the network device, the received frame as a testing frame;
- instructions for generating, by the layer 2 protocol implementation, a response frame based on the testing frame;
- instructions for identifying, by the layer 2 protocol implementation, a configurable priority level associated with the response frame;
- instructions for placing the response frame in a priority queue of a plurality of priority queues, wherein the priority queue is associated with the configurable priority level; and
- instructions for transmitting, from the priority queue, the response frame toward the sending device.

15. The non-transitory machine-readable storage medium of claim 14, wherein the instructions for identifying the configurable priority level comprise instructions for identifying a designation of the priority level included in the testing frame.

16. The non-transitory machine-readable storage medium of claim 14, wherein the instructions for transmitting the response frame refrain from suspending transport of other frames corresponding to non-diagnostic traffic.

17. The non-transitory machine-readable storage medium of claim 14, wherein the instructions for identifying the received frame as a testing frame comprise:
- instructions for determining, by an Ethernet port of the network device, that a destination address included in the received frame is an address of the network device.

18. The non-transitory machine-readable storage medium of claim 14, wherein the instructions for identifying the received frame as a testing frame comprise:
- instructions for determining, by an Ethernet port of the network device, that an Ethernet sub-type carried by the received frame indicates that the received frame is a testing frame.

19. The non-transitory machine-readable storage medium of claim 14, wherein the instructions for generating the response frame comprises:
- instructions for setting, by an Ethernet port of the network device, a destination address of the response frame equal to a source address of the received frame; and
- instructions for setting, by the Ethernet port of the network device, an Ethernet sub-type of the response frame equal to a value that identifies the response frame as a responding to a test frame.

20. The non-transitory machine-readable storage medium of claim 14, wherein the instructions for identifying the received frame and generating the response frame are configured to execution by an Ethernet port of the network device.

\* \* \* \* \*